United States Patent
Jeppe (10) Patent No.: US 7,415,365 B2
(45) Date of Patent: Aug. 19, 2008

(54) STRUCTURE-BORNE SOUND SENSOR UNIT

(75) Inventor: Eckehard Jeppe, Zierenberg (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 11/691,909

(22) Filed: Mar. 27, 2007

(65) Prior Publication Data

US 2007/0233416 A1 Oct. 4, 2007

(30) Foreign Application Priority Data

Mar. 30, 2006 (DE) .................. 10 2006 015 152

(51) Int. Cl.
*G01H 11/00* (2006.01)

(52) U.S. Cl. .................. 702/56; 73/645; 56/10.2 C; 56/10.2 J (58) Field of Classification Search .................. 702/33, 702/39, 56, 57, 78, 124, 126, 189, 190; 73/35.08, 73/593, 587; 340/426.3, 443, 447, 457.1, 340/825.72; 700/280; 56/10.2 J
See application file for complete search history.

(56) References Cited

U.S. PATENT DOCUMENTS

| | | | | |
|---|---|---|---|---|
| 4,530,240 A | * | 7/1985 | Board et al. .................. 73/593 |
| 5,312,299 A | * | 5/1994 | Behnke et al. .................. 460/5 |
| 5,668,744 A | * | 9/1997 | Varadan et al. ............. 700/280 |
| 6,060,913 A | * | 5/2000 | Vulih et al. .................... 327/91 |
| 6,146,268 A | | 11/2000 | Behnke et al. |

FOREIGN PATENT DOCUMENTS

DE 30 10 416 9/1981
EP 0 883 983 12/1998

OTHER PUBLICATIONS

Cakmakci et al., Bi-Directional Communication among "Smart" Components in a Networked Control System, Jun. 8-10, 2005, 2005 American Control Conference, p. 627-632.*

* cited by examiner

*Primary Examiner*—Marvin M. Lateef
*Assistant Examiner*—Mi'schita' Henson
(74) *Attorney, Agent, or Firm*—Michael J. Striker (57) ABSTRACT

A structure-borne sound sensor unit, in particular for an agricultural machine, includes a signal converter, which converts a mechanical sensor signal into an electrical sensor signal, and preprocessing electronics, which are connected with the signal converter. The preprocessing electronics include at least one programmable function component, a data input for receiving configuration data, and a programming interface to configure the function component based on the configuration data received. A control unit for a such a structure-borne sound sensor unit, a sensor system, which includes such a control device and such a structure-borne sound sensor unit, and a related method for controlling such a structure-borne sound sensor unit are provided.

23 Claims, 5 Drawing Sheets

STRUCTURE-BORNE SOUND SENSOR UNIT

CROSS-REFERENCE TO A RELATED APPLICATION

The invention described and claimed hereinbelow is also described in German Patent Application DE 10 2006 015 152.6 filed on Mar. 30, 2006. This German Patent Application, whose subject matter is incorporated here by reference, provides the basis for a claim of priority of invention under 35 U.S.C. 119(a)-(d).

BACKGROUND OF THE INVENTION

The present invention relates to a structure-borne sound sensor unit, in particular for an agricultural machine, with a signal converter, which converts a mechanical sensor signal into an electrical sensor signal, and with preprocessing electronics, which are connected with the signal converter.

The present invention also relates to a control unit for such a structure-borne sound sensor unit, a sensor system with a structure-borne sound sensor unit, and a control device of this type.

The present invention also relates to an agricultural machine with such a sensor system, and a method for controlling a structure-borne sound sensor unit of this type.

Structure-borne sound sensors, which are often referred to as "knock sensors", are offered by various manufacturers. They are installed, in a suitable manner, on a pulse detector, e.g., directly on a suitable component of a working unit, the operating state of which is to be monitored, such that the structure-borne vibrations that occur in the particular component and that result from a certain event to be monitored can be registered by the sensor. To this end, the sensors utilize a piezo element to convert the structure-borne sound vibrations—which are usually high-frequency—into an electrical signal. Knock sensors of this type are used primarily in automotive applications. The sensors are mounted on the housing of the engine block, e.g., to regulate engine knock.

In agricultural machine technology, structure-borne sound sensors are also installed in highly diverse locations, to detect various types of vibrations and structure-borne sounds. For example, structure-borne sound sensors are used in combine harvesters to measure crop throughput and/or grain losses. To this end, a sensor of the type mentioned initially is described in EP 0 883 983 B1, which is mounted on a pulse detecting panel, which is located such that the remaining grain or waste grain in the crop material flow drops onto the pulse detecting panel and generates vibrations, which are converted into an electrical sensor signal by the signal converter. With forage harvesters, sensors of this type are used, e.g., to detect knock signals of the blades of the chopper drum on a shear bar, in order to monitor the cutting gap. An application of this type is described, e.g., in DE 30 10 416 A1. Structure-borne sound sensors can also be used in agricultural machines, e.g., as rock detectors or unbalance sensors on rotating working units.

The sensor signals must be evaluated in a control device in order to detect a certain event. With previous systems, the control device must use special input circuitry—which has been designed for the particular application of the sensor—to receive and further process the electrical signal coming from the sensor. The sensors must also be equipped differently depending on the application. There are therefore different structure-borne sound sensor units and control devices for every application. With engine knock regulation, for example, in the case of which relatively large sensor signals are produced, the sensor signals are received directly by the control device via a line connection coming from the sensor, and they are processed further in a suitable manner by the special input circuit of the control device. In the case of a knock sensor for measuring grain loss in a combine harvester, however, the measurement voltages produced at the sensor are small. Due to the losses that inevitably occur in the line from the sensor to the control device, it is therefore necessary to first amplify the signals at the sensor. The preprocessing electronics required for this are coupled directly to the sensor housing. With a sensor that is used as a loss sensor, the preprocessing electronics can also include an adjustable analog pass filter that can be adjusted for various crop materials using a preselection circuit, as described in EP 0 883 983 B1.

The disadvantage of the structure-borne sound sensor units and sensor systems described above is that they are relatively inflexible in terms of their application. Manufacturers of agricultural machines, for example, require highly diverse types of sensors and control devices with special circuitry for highly diverse applications, such as loss sensors, engine knock monitoring, unbalance sensors, cutting gap controls, etc. In terms of the manufacture of agricultural machines, this results in relatively high stockpiling costs, and it poses a problem for service, since the individual service stations must maintain stockpile a sufficient number of highly diverse sensor types and sensor control devices so they can repair a sensor system quickly when it fails. It must be taken into account that it is very costly when a machine breaks down during harvesting season, so these "down times" must be kept to a minimum.

SUMMARY OF THE INVENTION

The object of the present invention, therefore, is to create a structure-borne sound sensor unit, a control device, a sensor system, and a method for controlling a structure-borne sound sensor unit which enable universal use of the structure-borne sound sensor unit and/or the control device for highly diverse measurement applications.

An inventive structure-borne sound sensor unit includes a signal converter, which converts a mechanical sensor signal into an electrical sensor signal, and preprocessing electronics which are connected with the signal converter. The preprocessing electronics are preferably connected very close to the signal converter, preferably in a housing or in housings that are coupled directly next to each other. According to the present invention, the preprocessing electronics include a programmable function component, a data input for receiving configuration data, and a programming interface to configure the function component based on the configuration data received. The function component can be highly diverse types of devices. It is preferably a programmable digital filter. As an alternative, or preferably, it can also be a programmable, adjustable signal amplifier, and/or a programmable integrating device. By transmitting suitable configuration data to the programming interface, it is possible to adjust certain filter characteristics and characteristic curves, e.g., for a digital filter. It is also possible to adjust certain characteristic curves for an amplifier or an integrating device.

Based on the configuration data, it is then possible to evaluate, in the pre-evaluation electronics, the electrical sensor signals received from the signal converter in accordance with the requirements of the configuration data in terms of signal frequency and/or a characteristic frequency curve and/or a signal amplitude. The inventive structure-borne sound sensor unit can therefore be adjusted exactly to the particular application using the configuration data without having to make any design changes.

An inventive control device for a structure-borne sound sensor unit of this type requires a configuration device for determining configuration data to configure a programmable function component of preprocessing electronics of the structure-borne sound sensor unit, and a data output in order to send the configuration data to the structure-borne sound sensor unit. Using this control device, an inventive structure-borne sound sensor unit can be configured for a particular application, and it can be reconfigured when the application is changed.

The control device preferably also includes a signal input for receiving the sensor signals that were preprocessed by the structure-borne sound sensor unit, an evaluation unit for evaluating received sensor signals, and a signal output for sending a control and/or information signal depending on a sensor signal that was sent. In this case, the control unit can be used to configure the sensor unit, which is also used to evaluate the control signals. It is also pointed out, however, that it is not absolutely necessary for the structure-borne sound sensor unit to be configured using the same control device that is used to evaluate the sensor signals. It is entirely possible, for instance, for a control device in the agricultural machine to only evaluate the sensor signals, and for the inventive structure-borne sound sensor unit to be programmed, e.g., when the sensor unit is installed in the factory or service station, using an external control device designed as a mobile programming device that has been connected especially for this purpose.

An inventive sensor system should include at least one control device and at least one associated structure-borne sound sensor unit. It is also preferably possible for one control unit to serve several structure-borne sound sensor units simultaneously.

With an inventive method for controlling a structure-borne sound sensor unit, particularly for an agricultural machine, it is therefore possible to modify sensing characteristics of the structure-borne sound sensor unit for various sensor applications using software control.

To this end, in accordance with the embodiments described above, a programmable function component of the preprocessing electronics can be configured using the configuration data sent to the preprocessing electronics, i.e., depending on the design of the structure-borne sound sensor units, it is possible to adjust, e.g., certain filter characteristics and characteristic curves in order to adjust the structure-borne sound sensor units for the desired application.

The use of the inventive, programmable, universally usable structure-borne sound sensor unit ensures that stockpiling costs are reduced considerably, and it allows a reduction in the amount of logistical effort required to ensure that an adequate inventory of sensors is always available at the service sites so that the functionality of a sensor system can be restored when the sensor system suddenly fails.

According to the present invention, the sensing characteristics of an inventive structure-borne sound sensor unit can be adjusted for the highly diverse sensor applications via software control, e.g., by transmitting suitable configuration data. In the field of agricultural machines, the following possible applications are particularly interesting:

use as a grain loss sensor, in order to measure grain losses;
use as a vibration sensor for monitoring bearing play and/or a distance between components that are movable relative to each other, e.g., to monitor the displacement of a shear bar on a forage harvester;
use as an unbalance sensor, e.g., to monitor the concentric running of a feed cylinder and to detect damage at an early stage;
use as a foreign object detector, to detect foreign objects—rocks, in particular—that are embedded in the crop material.

Depending on the application, it must be ensured that the signal converter is mechanically coupled in a suitable manner with a component of the working unit to be monitored, or with a special pulse detector. With a preferred application as a loss sensor, the signal converter is mechanically coupled to a pulse detector, e.g., a baffle plate or a metal bar, so that the vibrations produced when crop grains strike the pulse detector are converted into electrical sensor signals by the signal converter. The structure-borne sound sensor unit can be designed in a similar manner, to enable detection of rocks in the incoming crop material.

When the control device is also used, in particular, to evaluate the sensor signals, in order to program the structure-borne sound sensor unit, the data input of the structure-borne sound sensor unit is preferably designed such that it receives the configuration data via a signal line that is used to send out the preprocessed electrical sensor signals. Accordingly, the data output of the control device should be designed such that it sends the configuration data via a signal line connected to the signal input that serves to receive the preprocessed electrical sensor signals. Complex cable connections can therefore be simplified; only one signal and data cable is required between the particular structure-borne sound sensor units and the control device.

To simplify the programming of the structure-borne sound sensor unit, the control device and/or the preprocessing electronics of the structure-borne sound sensor unit preferably include a memory device, in which a number of configuration data records for configuring the function components is stored. This memory device does not necessarily have to be located directly inside the control device or the preprocessing electronics. Instead, it is sufficient for the control device and/or the preprocessing electronics to have access to this memory device.

These configuration data records can be, e.g., specific replaceable characteristic curves for a filter and/or an amplifier and/or an integrator of the preprocessing electronics. The configuration data records are preferably assigned to various sensor applications of the structure-borne sound sensor units, i.e., there are special configuration data records for the application as a grain loss sensor, for monitoring bearing play in a rotating working unit, for an unbalance sensor, a rock detector, or a position sensor for adjustable assemblies, etc.

With a particularly preferred exemplary embodiment, the structure-borne sound sensor units are designed such that they not only detect mechanical pulses and convert them to electrical signals, they can also generate mechanical signals in a controlled manner. It is generally known, for example, that piezo elements can be used to convert mechanical vibrations into voltage changes, and that a piezo element can generate mechanical vibrations via the application of voltage. With a particularly preferred exemplary embodiment, the structure-borne sound sensor unit therefore also includes a signal transmitter, to actively generate mechanical signals using the signal converter based on activation signals that were received. To do this, the signal transmitter applies electrical voltage pulses to the signal converter.

With a design of the structure-borne sound sensor units of this type, it is possible to run a test of the structure-borne sound sensor units or the sensor system in configurations in which several structure-borne sound sensor units are connected with each other via an oscillatory component. A typical case is the use of several structure-borne sound sensor units located on one pulse detecting panel.

With a particulary preferred refinement of the inventive method, a test signal is sent to a first structure-borne sound sensor unit, based on which mechanical signals are generated by the signal converter of the first structure-borne sound sensor unit. These mechanical signals are then detected by a second structure-borne sound sensor unit and converted into electrical sensor signals. The electrical signals are preprocessed and checked, and, based on a test result, the configuration data, e.g., for the second structure-borne sound sensor unit, are determined. This is also possible using a control device designed as an external testing and/or programming module that is connected to the sensor units in the factory or a service station. The method can also be carried out using the control device, which still serves to evaluate the control signals.

To this end, a control device preferably includes a calibration device with a test signal generating unit for generating test signals for a first structure-borne sound sensor unit, and a test signal evaluation unit, to check a sensor signal received by a second structure-borne sound sensor unit in response to a test signal that was sent out, and to then determine the configuration data based on a test result.

The test signals can be sent with various frequencies, and entire frequency ranges can be covered with the test signal. It is therefore possible to carry out comprehensive sensor calibration with regard for amplification factors and the frequency response. It is then no longer necessary to install additional elements that generate knock signals for a test. This is advantageous in particular because, in many cases, several sensors are used on one pulse detector any way, to ensure functional reliability. Preferably, all of the structure-borne sound sensor units used are designed with corresponding signal transmitters, so that each of the structure-borne sound sensor units can be tested; this test is carried out by another structure-borne sound sensor unit sending out the test signal.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

It will be shown below how the present invention can be used in agricultural machines, particularly in harvesting machines such as combine harvesters or forage harvesters. This does not rule out the possibility however, that the inventive structure-borne sound sensor units, control devices and sensor systems can also be used in other machines or devices, e.g., in motor vehicles. In those applications, there is also typically a need for universally usable structure-borne sound sensor units, so that various measurements can be carried out using structure-borne sound sensor units with a similar design in terms of hardware, so that stockpiling costs can be reduced and repair times can be shortened.

Figure 1:
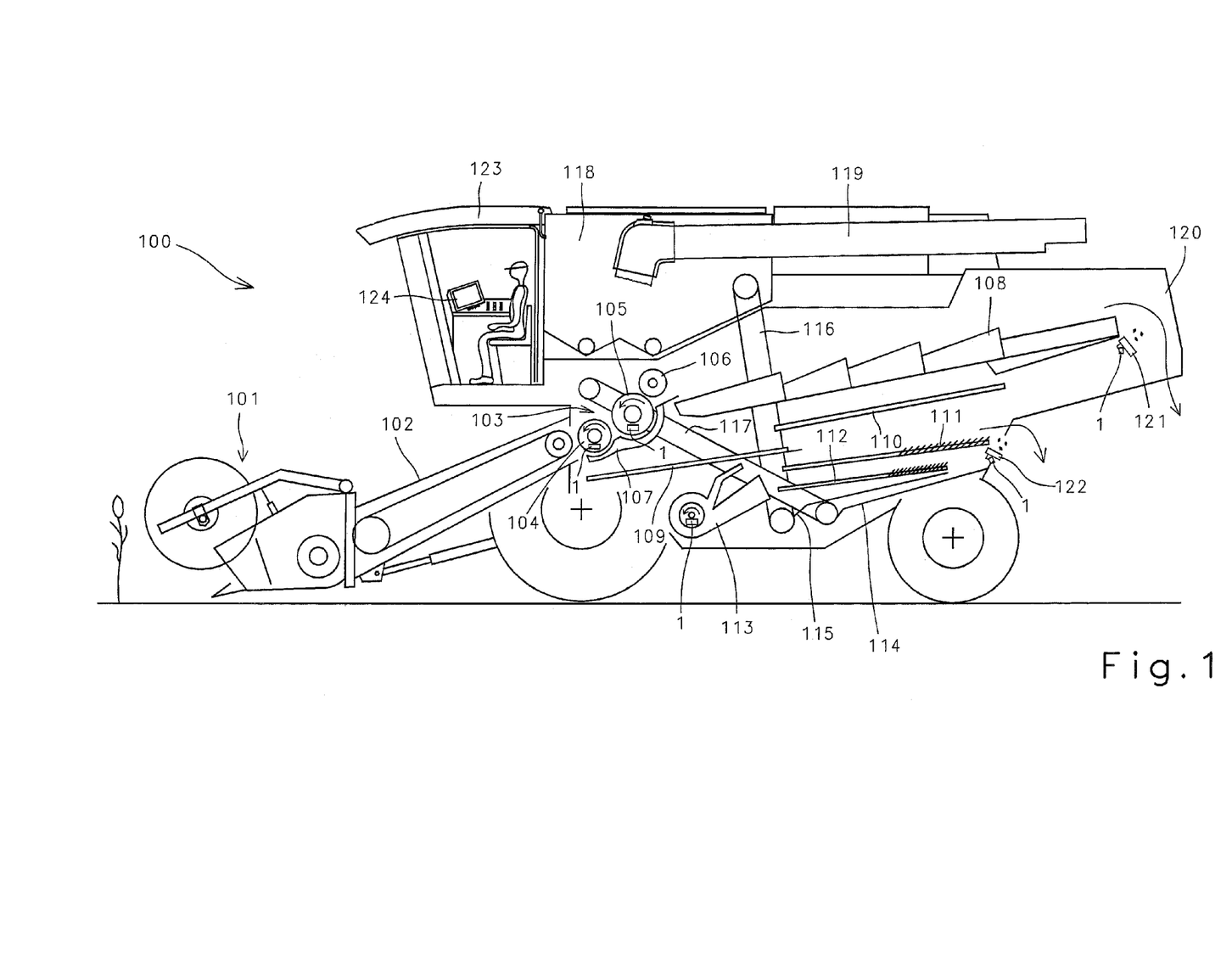
FIG. 1 shows a schematic cross section through a combine harvester.

The exemplary embodiment of the present invention shown in FIG. 1 is a self-propelled combine harvester 100 with a cross-flow threshing mechanism 103 and a straw walker 108 located behind it, as the separating unit. A cleaning unit is located beneath the straw walker 108; cleaning unit is composed of several stacked sieves 111, 112, and a blower 113.

The mode of operation of a combine harvester 100 of this type is as follows:

Using a reel of the cutting disc, the crop material is placed on mowing unit 101 and is cut using knives. The crop material is then conveyed via a header auger and a feed rake in a feeder housing 102 to the inlet of threshing mechanism 103. A feed and/or preacceleration cylinder 104 is located at the inlet of threshing mechanism 103. A cylinder 105 is located behind threshing mechanism 103, in the direction of crop flow. Located beneath cylinder 105 is a concave 107 which is shaped to encompass cylinder 105. The crop material coming out of feeder housing 102 is grasped by preacceleration cylinder 104 and pulled further by cylinder 105 through the threshing gap between cylinder 105 and concave 107. The crop material is threshed by the beater bars of cylinder 105, and a grain-chaff mixture drops through concave 107 and is then guided via a feed pan 109 to the cleaning unit in order to separate the grains from the admixtures.

From threshing mechanism 103, the threshed crop flow is directed by impeller 106 to tray-type straw-walker 108, via which the grain and any short straw and chaff located in the crop flow is separated out. The grain, short straw and chaff also reach the cleaning device, via a further feed pan 110.

The grain is separated from the non-grain components in the cleaning unit in that wind is blown through the sieve openings (holes, mesh, slits) into oscillatory-driven sieves 111, 112 using blower 113; the wind loosens the crop material directed over sieves 111, 112 and ensures that the specifically lighter chaff and short-straw portions are separated out, while the heavy crop grains fall through the sieve openings. An upper sieve 111 and a lower sieve 112 are located one on top of the other in certain areas such that the crop material is sifted with different levels of fineness at the various levels.

The grain that passes through sieves 111, 112 of the cleaning unit drops to a first capture and guide floor 115 and is conveyed to a grain-delivery auger. The grain is then conveyed by an elevator 116 into a grain tank 118 of combine harvester 100, from where it can be transferred to a trailer as necessary using a tank unloading conveyor 119.

The particles in the cleaning unit that initially fall, at the rear end, through the sieve openings of upper sieve 111 are usually heavier particles, i.e., particles that contain a grain particle that has not been fully separated from the other grain components. These particles fall, behind lower sieve 112, onto a second capture and guide floor 114 located beneath and somewhat behind the first capture and guide floor 115, and are returned to threshing mechanism 103 as tailings via a tailings elevator 117.

Components that do not fall through upper sieve 111 are discarded as a loss. The straw and a certain percentage of waste grain also travel via tray-type shaker 108 to the rear end 120 of combine harvester 100, from where they are ejected.

To measure the losses that occur behind upper sieve 111 and behind tray-type shaker 108, pulse detectors 121, 122 designed as baffle plates or bars are located behind these components 111, 108. The falling grain components strike pulse detectors 121, 122 and generate a mechanical pulse there, which causes pulse detectors 121, 122 to vibrate. Inventive structure-borne sound sensor units 1 are located on pulse detectors 121, 122. Inventive structure-borne sound sensor units 1 are also located on machine 100 on the various rotating units, e.g., on straw beater 104 and cylinder 105, and on blower 113, which serve to monitor working units 104, 105, 113.

Structure-borne sound sensor units 1 are connected with a control device (not shown in FIG. 1), which—as will be explained in greater detail below—evaluates the signals coming in from structure-borne sound sensor units 1 and forwards related control and/or information signals to further control units to control the individual working units, or to a control terminal 124 in a driver's cab 123, so that a response can be carried out automatically or by a driver depending on these control and/or information signals.

Figure 2:
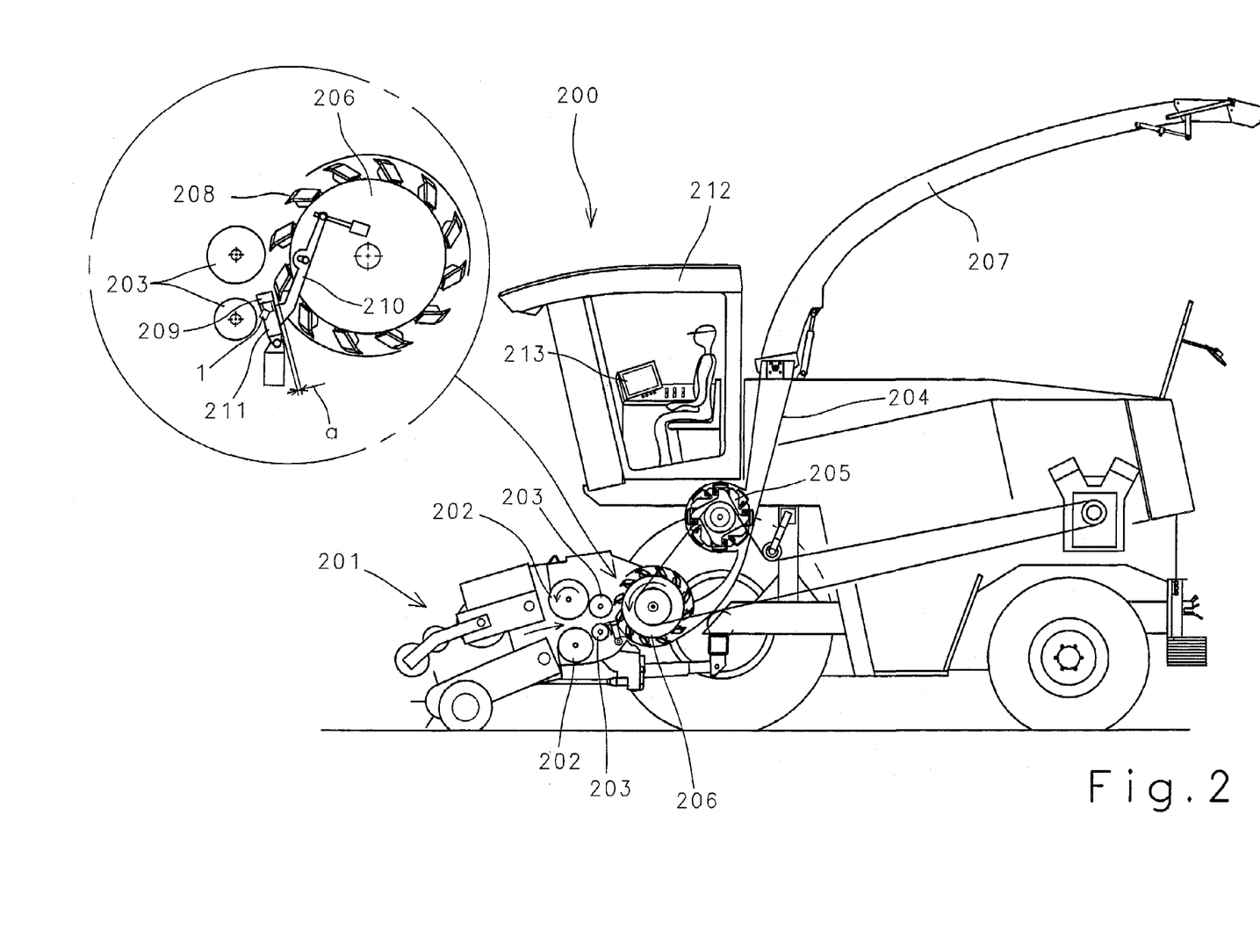
FIG. 2 shows a schematic cross section through a forage harvester with an enlarged view of the chopper drum.

The exemplary embodiment of a harvesting machine shown in FIG. 2 is a forage harvester 200, which picks up grass swaths using a pick-up attachment 201. The grass is chopped in forage harvester 200 and transferred via an upper discharge chute 207 to a transport vehicle (not shown) that is being driven next to it. To carry out this working process, forage harvester 200 includes a typical feed roller 202 on the intake side, behind pick-up attachment 201. Feed roller 202 guides the crop material to compression rollers 203. A stationary knife 209 with a cutting lip is located behind compression roller 203. Stationary knife 209 extends parallel with the axis of rotation of a knife drum (also referred to as a chopper drum 206), which has knives 208 mounted on its circumference. Knives 208 of chopper drum 206 move in succession along the shear bar of stationary knife 209 via their cutting lips. This motion chops the crop material and simultaneously conveys it upwardly to a post-acceleration cylinder 205, which accelerates the crop material at a high velocity through a lower discharge chute 204 and further through upper discharge chute 207.

To ensure optimal preparation of the crop material and to produce the smallest possible cutting forces, the distance between the shear bar of stationary knife 209 and the cutting lips of rotating knife 208 must be kept to a minimum. Cutting gap a is preferably in the range of 0.2 mm. Since the cutting lips of the knives wear down over time, gap a must be continually adjusted. To this end, stationary knife 209 is hingedly mounted on a knife holder 211 and is capable of being displaced via motor action using an adjusting mechanism 210. In the adjustment process, it must be noted that knife 209 is not moved so close to rotating chopper drum 206 that one of the knives 208 located on chopper drum 206 comes in contact with stationary knife 209. To this end, an inventive structure-borne sound sensor unit 1 is located on stationary knife 209. If stationary knife 209 is moved too close to chopper drum 206 to adjust knife gap a, the cutting lip of knife 208 on chopper drum 206 that extends radially outwardly the furthest strikes the cutting lip of stationary knife 209. As a result, a structure-borne vibration signal is generated in stationary knife 209, which is registered immediately by structure-borne sound sensor unit 1. As a result, stationary knife 209 is swiveled back slightly. In this manner, maladjustment can be reliably prevented.

In this case as well, structure-borne sound sensor unit 1 is connected with a control device (not shown in FIG. 2), which evaluates the signal, transmits a related information and control signal to a control device for adjusting stationary knife 209, and outputs a "warning" signal to a control terminal 213 in a driver's cab 212. Using structure-borne sound sensor unit 1, it is also possible to register when a rock or any other type of hard, foreign object strikes chopper drum 206. Emergency shut-off can then be carried out and an alarm message can be output to the driver.

It is also possible to locate additional structure-borne sound sensor units on the various rotating working units themselves, e.g., header auger 202, compression roller 203, post-acceleration cylinder 205, or chopper drum 206, in order to detect unbalance in these units.

Figure 3:
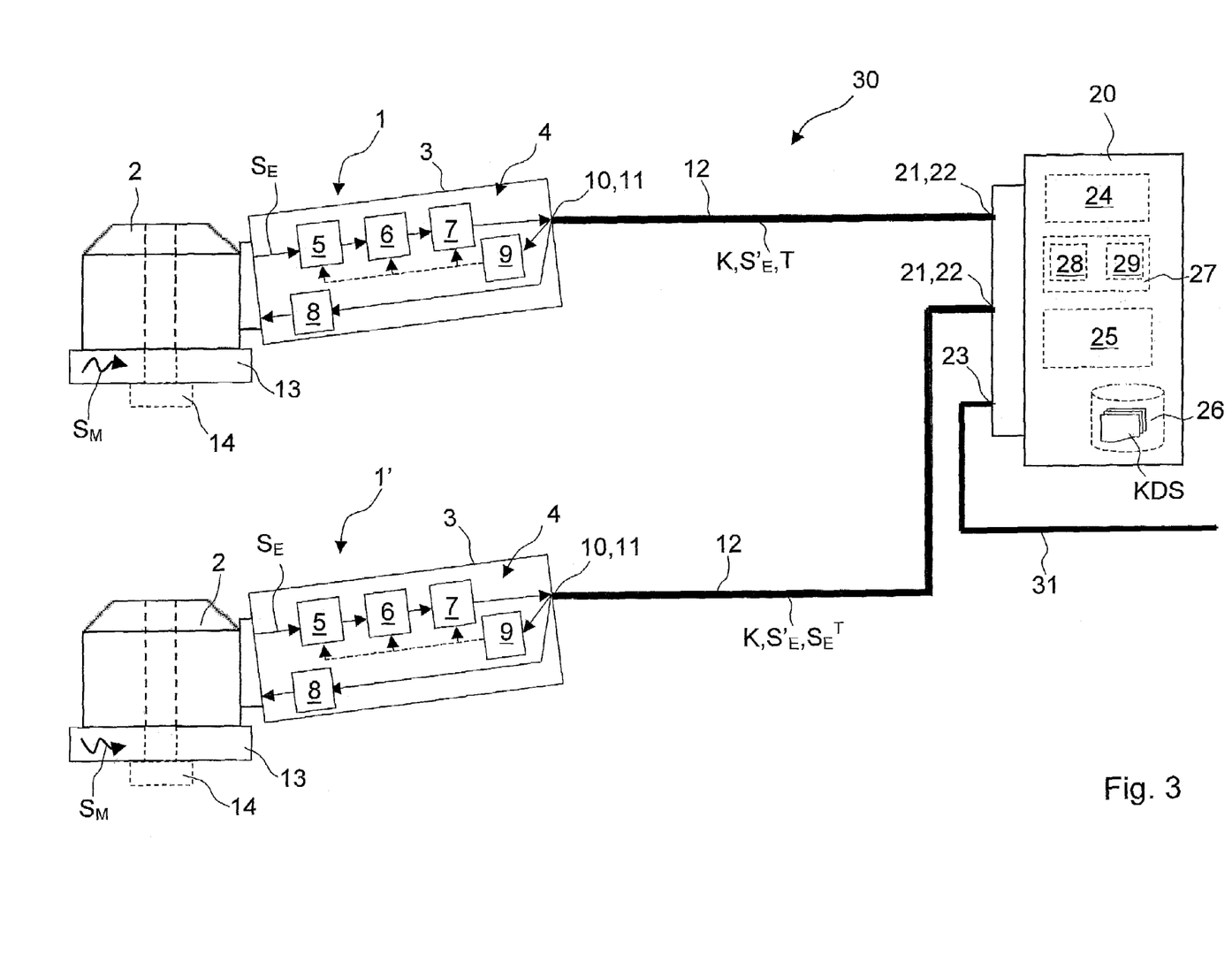
FIG. 3 is a schematic illustration of two structure-borne sound sensor units connected to a control device, according to an exemplary embodiment of the present invention.

One possible configuration of inventive structure-borne sound sensor units 1, 1' is depicted in detail in FIG. 3. FIG. 3 shows a sensor system 30, which is composed of two identically designed structure-borne sound sensor units 1, 1', and a control device 20, via which preprocessed sensor signals $S'_E$ coming from structure-borne sound sensor units 1, 1' are evaluated and by way of which structure-borne sound sensor units 1, 1' can be programmed.

Each of the structure-borne sound sensor units 1, 1' includes a signal converter 2 designed as a piezo crystal that is mounted in a known manner on a pulse detector 13, e.g., a pulse detecting panel, for registering knock signals $S_M$ generated by grains that strike pulse detecting panel. Installation can be accomplished using a screw 14. The exact mechanical design is described, e.g., in EP 0 883 983 B1.

Preprocessing electronics 4 are located directly on actual signal converter 2 in a housing 3 that is mounted on the signal converter. Entire structure-borne sound sensor unit 1, 1' with signal converter 2 and preprocessing electronics 4 can also be cast, to protect them from external influences.

Preprocessing electronics 4 include several programmable function components 5, 6, 7. A first function component is an adjustable amplifier 5, to amplify an electrical sensor signal $S_E$ generated by signal converter 2. The amplified signal is then forwarded to a programmable digital filter 6, which can be used as a band-pass filter, a low-pass filter, or a high-pass filter, depending on the setting. Located downstream of this is an adjustable integrator 7, which can integrate an incoming, amplified and filtered signal, in order to thereby generate a digital output signal $S'_E$. Using integrator 7, it is also possible to set an adjustable threshold value, i.e., integrator 7 can also function as a comparator. A digital output signal $S'_E$ preprocessed in this manner is then sent via a signal output 10 and a signal line 12 to control device 20.

All function components 5, 6, 7 are adjustable and programmable in the manner described. To this end, preprocessing electronics 4 include a programming interface 9 that is connected to a data input 11. Via programming interface 9, amplifier 5, filter 6, and integrator 7 can be adjusted correctly, depending on configuration data K received via data input 11, so that structure-borne sound sensor units 1, 1' function as required for the desired application, e.g., as a knock sensor or unbalance sensor. Typical adjustments are explained below with reference to FIGS. 4 through 6. Programming interface 9 can have one of several different designs. It can be, e.g., a serial interface, an LIN interface, or the like.

In the exemplary embodiment shown, signal output 10 and data input 11 are realized in an input/output 10, 11. That is, via a line 12 connected to input/output 10, 11, sensor signals $S'_E$ are transmitted from structure-borne sound sensor unit 1, 1' to control unit 20, and suitable configuration data K are sent from control device 20 to programming interface 9, in order to configure structure-borne sound sensor units 1, 1' in the desired manner.

Preprocessing electronics 4 also include a signal transmitter 8, which, when a test signal T is received—which can also be transmitted by control device 20 via signal line 12 to structure-borne sound sensor unit 1—outputs voltage pulses to signal converter 2, so that a mechanical knock signal can be generated in pulse detector 13, for test purposes.

With the preferred exemplary embodiment shown in FIG. 3, control device 20 includes a control input 21 for each control unit 1, 1' for receiving preprocessed sensor signals $S'_E$, and it includes a data output 22 for sending configuration data K to particular structure-borne sound sensor unit 1, 1'. Signal inputs 21 and data outputs 22 are again combined into one input/output 21, 22, to which particular signal line 12 to related structure-borne sound sensor unit 1, 1' is connected. During normal sensor operation, signal line 12 transports the sensor value, i.e., sensor signal $S'_E$, e.g., as a voltage signal or a frequency signal, to control device 20. Sensor signal $S'_E$ sent out by the structure-borne sound sensor units can be, e.g., between 0 and 5 volt; the lower and/or upper voltage range can be used as a diagnostic range for line interruptions or for measuring short-circuits.

In the exemplary embodiment depicted in FIG. 3, control device 20 includes only two inputs/outputs 21, 22 combined in this manner. In actuality, a control device 20 of this type can also include a larger number of inputs/outputs 21, 22, in order to connect a large number of additional structure-borne sound sensor units.

Components of control device 20 include an evaluation device 24, which evaluates incoming sensor signals $S'_E$, and, depending thereon, outputs control and/or information signals to a signal output 23, e.g., via a data bus 31. Data bus 31 leads, e.g., to other modules, which serve to control the particular working units, and/or to a display system in the driver's cab. Control device 20 also includes a configuration device 25, which determines configuration data K for configuring individual structure-borne sound sensor units 1, 1'. Configuration data K are then transmitted to individual structure-borne sound sensor units 1, 1' and/or their programming interfaces 9.

With the preferred exemplary embodiment shown in FIG. 3, different configuration data records KDS are stored in a memory 26 of control device 20 for different applications. In order to use a universally applicable, inventive structure-borne sound sensor unit 1, 1' for a certain purpose, structure-borne sound sensor unit 1, 1' need only be installed in the appropriate location in the machine and connected via a signal cable 12 with control device 20. Via bus 31, control device 20 can be triggered to send a configuration data record KDS that is suited for the intended application to particular structure-borne sound sensor unit 1, 1' in order to configure function components 5, 6, 7 of structure-borne sound sensor unit 1, 1' in accordance with the application.

Figure 4:
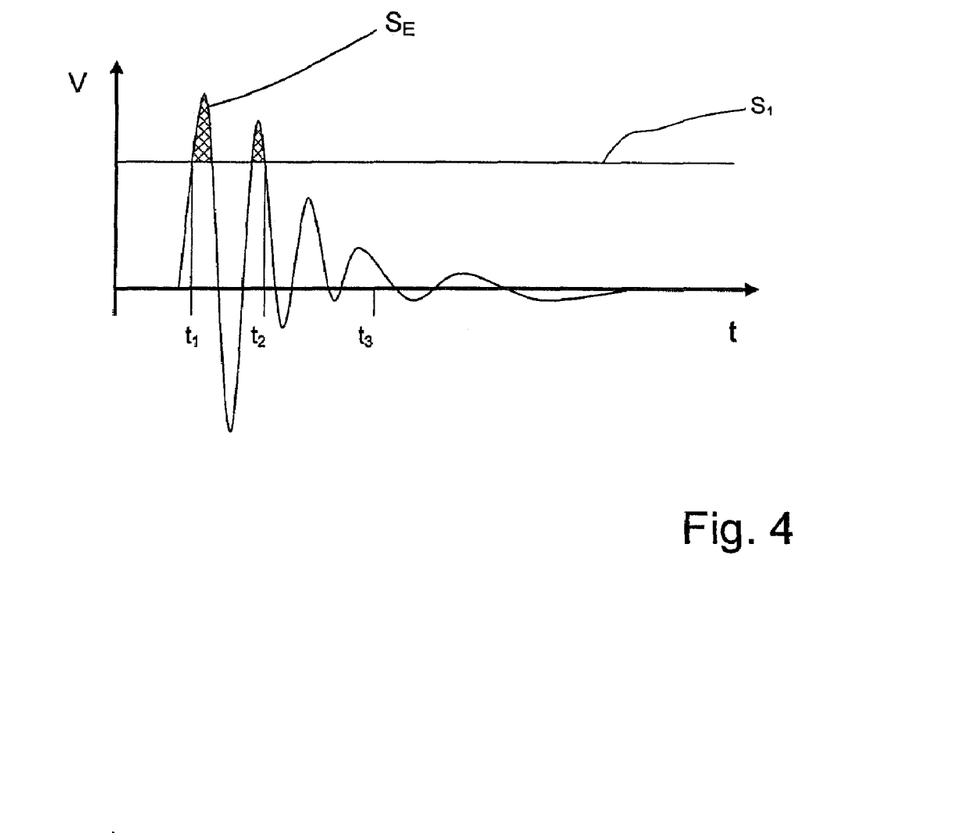
FIG. 4 is an illustration of a typical sensor signal when the structure-borne sound sensor unit is used to monitor throughput.

The flexible structure-borne sound sensor units described above can be used as described either as a sensor for a loss sensor system in the combine harvester, as a sensor for adjusting the shear bar in a forage harvester, as an unbalance sensor for various working units, or as a rock detector. To this end, the sensing characteristics of the structure-borne sound sensor units can be modified, e.g., with regard for a signal frequency and/or a characteristic frequency curve, and/or a signal amplitude. Typical adjustment examples are explained below:

1. Use of the structure-borne sound sensor units to monitor throughput or as a loss sensor:

With this setting, the signal from signal converter 2 is first amplified by amplifier 5 and then filtered by digital filter 6, which is configured to function as a high-pass filter. Only those signals with frequencies greater than 2 kHz are allowed to pass.

The remaining throughput/loss signal is then processed into outgoing sensor signal $S'_E$. This is carried out in integrating device 7 by integrating all signal components above an adjustable threshold over a certain period of time. This is shown in FIG. 4. Depicted in FIG. 4 is a vibration signal $S_E$ (with post-pulse oscillations) generated by a grain striking the pulse detector; vibration signal $S_E$ is depicted as a voltage value V over time t. All signal components located above threshold S are integrated over the period of time from $t_1$ to $t_3$. But, $t_1$ to $t_2$ is the only period of time when the signal is high enough that voltage amplitude V is above selected threshold value $S_1$. This means that only the shaded signal components are integrated and used for further processing. Threshold value $S_1$ can be adjusted according to the type of crop harvested. Currently, there are three thresholds: One for corn (large grains), one for grain (medium-sized grains), and one for rapeseed (small grains). This adjustment can also be carried out by control device 20 by transmitting suitable configuration data K to programming interface 9 of preprocessing electronics 4 of structure-borne sound sensor units 1, 1'.

The result, i.e., preprocessed sensor signal $S'_E$ sent out by structure-borne sound sensor unit 1, 1', can then be transmitted via control device 20 to the display unit in the driver's cab. Data bus 31 shown can be used, e.g., for this purpose. As an alternative, an analog voltage level evaluation can be carried out. In this context, it is pointed out that control device 20—within the framework of its evaluation of sensor signals $S'_E$ transmitted by structure-borne sound sensor units 1, 1'—can also basically forward these sensor signals $S'_E$ to other units, if this is desired.

In the example described above, preprocessing electronics 4 located in structure-borne sound sensor unit 1, 1' are therefore programmed in terms of signal amplification, the pass behavior of the filter, the threshold, and the integration time of the integrator, in order to generate a signal.

Figure 5:
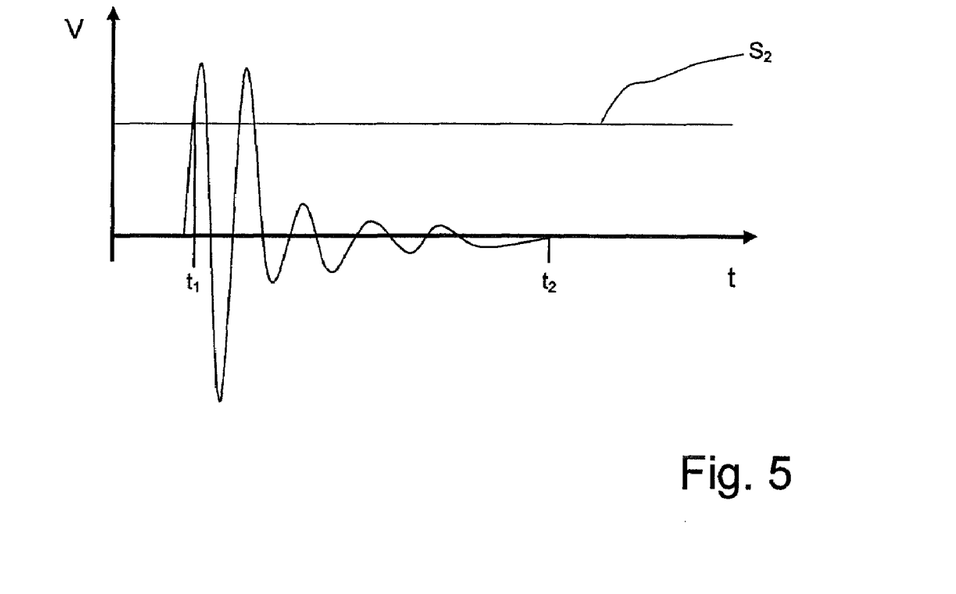
FIG. 5 is an illustration of a typical sensor signal when the structure-borne sound sensor unit is used as a knock sensor on the shear bar of a forage harvester.

2. Use of a structure-borne sound sensor unit as a knock sensor on the shear bar of a forage harvester:

Reference is hereby made to FIG. 5, which shows a typical voltage signal V over time t, when a chopper blade of the chopper drum strikes the shear bar of a stationary knife. In order to detect signals of this type, the original signal from signal converter 2 is filtered through a band-pass filter that allows frequencies between 4 and 11 kHz to pass. The knock is then detected via a signal produced after filter 6 and above a threshold value $S_2$. When a knock of this type is registered, evaluation of the sensor is halted for a certain period of time ($t_1$ to $t_2$), i.e., amplification is set to 0 for this period of time. This period of time can be, e.g., 9 ms. This is typically the period of time in which cutting gap a in the chopper is adjusted. The shortest possible reaction time is attained in this manner. When the structure-borne sound sensor unit is used in this manner, it is sufficient to react to the first knock signal, since this knock signal is generated by the blade that extends radially outwardly from the chopper drum the furthest. It is now absolutely clear that gap a must be increased. If additional knock signals would be generated periodically in this period of time (since the furthest-extending knife comes in regular contact with the shear bar), they would have to be processed in the preprocessing electronics, and this would increase the amount of work to be performed by the electronics. The reaction time can therefore be shortened by "hiding" the signals that follow the first knock signal.

With this exemplary embodiment, the preprocessing electronics of the structure-borne sound sensor units are therefore programmed in terms of the pass behavior of filter 6 and the threshold (specified by integrator 7, which functions only as a threshold value in this case), in order to generate a signal. Signal amplifier 5 is switched between only two values, 0 and 1. The same evaluation with modified threshold values and amplifications can also be used, e.g., to detect rocks in harvesting machines.

Figure 6:
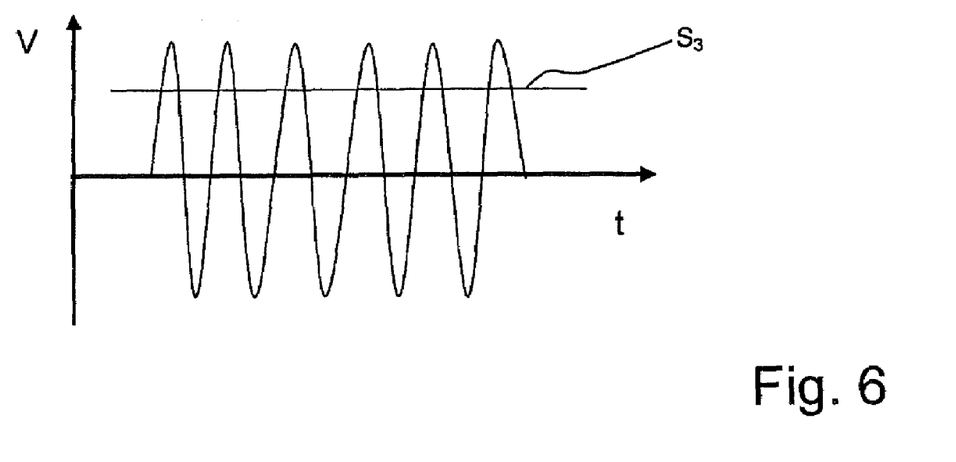
FIG. 6 is an illustration of a typical sensor signal when the structure-borne sound sensor unit is used to monitor bearings and shafts on a rotating working unit.

3. Use of a structure-borne sound sensor unit to monitor bearings and shafts:

The sensor signal is monitored in terms of a certain frequency. To this end, programmable digital filter 6 is adjusted such that it functions as a band-pass filter that filters out exactly one frequency or frequencies within a very narrow window. If there is a signal with this frequency, and it exceeds a threshold $S_3$, a signal $S'_E$ is sent to evaluation unit 20. Threshold $S_3$ can be adjusted again in the integrating device. This setting is depicted in FIG. 6; an even voltage signal V of an exactly defined frequency over time t, and selected threshold value $S_3$ are shown.

For this application, preprocessing electronics 4 in structure-borne sound sensor unit 1, 1' are therefore programmed with regard for the pass behavior of the digital filter and, possibly, threshold $S_3$, in order to generate a signal. Signal amplifier 5 can be programmed to a fixed amplification value.

This sensor setting can also be used for various other purposes. If, e.g., a knife is missing from the chopper drum of a combine harvester, a known oscillation with a known frequency of the chopper drum appears in the frequency band at a known rotational speed. A suitable sensor can therefore be installed in a suitable location and be programmed to detect exactly this frequency. If a signal with this frequency is generated, a warning signal is output to the operator of the combine harvester. A further example is when a ball bearing becomes damaged or a ball in a ball bearing is missing or becomes damaged. In this case as well, the noises can be detected using a sensor that has been programmed accordingly, based on a certain frequency at a known rotational speed of the shaft. The digitally programmable evaluation, i.e., digital filter 6 of sensor unit 1, 1' in particular, is programmed to a certain frequency. It can be reprogrammed at any time, e.g., when the rotational speed of the unit to be monitored changes.

The sensor signals can also be evaluated in terms of a certain signal edge, a certain signal shape, or another signal level. If a determined signal shape or signal edge conforms with a certain preprogrammed signal edge, signal shape, or another signal level, a signal is generated for downstream evaluation device 20, i.e., control device 20, which can then process this signal further and/or forward it directly to the appropriate modules and/or a display device.

As mentioned above, preprocessing electronics 4 also include a signal transmitter 8. It can be activated using test signals T output by control device 20. In this manner, a structure-borne sound sensor unit 1, 1' can be calibrated by control device 20. To this end, control device 20 includes a calibration unit 27, which includes a test signal generating unit 28 to produce test signal T, and a test signal evaluation unit 29 to evaluate a sensor signal $S_E^T$ that is determined in response to test signal T.

According to the calibration method, test signal T is first output to a first structure-borne sound sensor unit 1. Signal transmitter 8 located there generates a mechanical test signal in a pulse detector 13, which is detected again by a further structure-borne sound sensor unit 1'—which is coupled to the same pulse detector 13—and is converted to an electrical sensor signal. This sensor signal is then preprocessed according to the setting of preprocessing electronics 4, and is transmitted as preprocessed sensor signal $S_E^T$ back to control unit 20. Signal $S_E^T$ that has been received is checked in test signal evaluation unit 29, and configuration data K—which may have been modified—are sent to particular structure-borne sound sensor unit V, in order to calibrate it appropriately. In this manner, it is possible to calibrate all structure-borne sound sensor units 1, 1' without using any additional components, and it is possible to carry out complete functionality tests, and to even carry out frequency response determinations.

Using the present invention, it is therefore possible to use the same sensor hardware to sense highly diverse parameters. This results in a drastic reduction in development and stockpiling costs, and it speeds up repair times considerably.

Finally, it is pointed out once more that the machines and sensor systems depicted in the figures, and the settings described are merely preferred exemplary embodiments and they could be modified in a variety of ways by one skilled in the art, without leaving the framework of the present invention. For example, the entire control device does not necessarily have to be housed in one single housing. Instead, the components of the control device can be distributed throughout various locations in a machine. In particular, components of other control devices can be shared, or the control device itself is a component of a higher-order, central control system, which simultaneously serves to control other components of the machine, e.g., highly diverse working units. The control device can also be composed of a processor or a small computer, and the individual components, such as the evaluation device, the configuration device, or the calibration unit, can be realized in the form of software components on the processor or in the computing device.

In interest of completeness, it is also pointed out that the use of the indefinite article "a" does not preclude the fact that the particular feature can also occur in plurality.

It will be understood that each of the elements described above, or two or more together, may also find a useful application in other types of constructions and methods differing from the type described above.

While the invention has been illustrated and described as embodied in a structure-borne sound sensor unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A structure-borne sound sensor unit for an agricultural machine and having modifiable sensing characteristics for various sensor applications, comprising
a signal convertor which converts a mechanical sensor signal into an electrical sensor signal;

preprocessing electronics which are connected with said signal convertor and receive the electrical sensor signal, said preprocessing electronics including a programmable function component, said preprocessing electronics also including a data input receiving configuration data, and a programming interface configuring said function component of said preprocessing electronics based on the configuration data received to modify the sensing characteristics, so that the structure-borne sound sensor unit functions as required for a desired application selected from the various sensor applications without design changes.

2. A structure-borne sound sensor unit as defined in claim 1, wherein said function component of said preprocessing electronics includes a programmable digital filter.

3. A structure-borne sound sensor unit as defined in claim 1, wherein said function component of said preprocessing electronics includes a programmable amplifier.

4. A structure-borne sound sensor unit as defined in claim 1, wherein said function component of said preprocessing electronics includes a programmable integrating device.

5. A structure-borne sound sensor unit as defined in claim 1, further comprising a pulse detector, said signal convertor being mechanically coupled to said pulse detector in a manner such that when particles strike said pulse detector, vibrations that are produced are converted by said signal convertor into the electrical sensor signals.

6. A structure-borne sound sensor unit as defined in claim 1, wherein the data input is configured such that it receives the configuration data via a single line that serves to send out preprocessed, electrical sensor signals.

7. A control device for a structure-borne sound sensor unit for an agricultural machine and having modifiable sensing characteristics for various sensor applications, including a signal convertor which converts a mechanical sensor signal into an electrical sensor signal, and preprocessing electronics which are connected with said signal convertor and receive the electrical sensor signal, said preprocessing electronics including a programmable function component, said preprocessing electronics also including a data input receiving configuration data; and a programming interface configuring said function component of said preprocessing electronics based on the configuration data received to modify the sensing characteristics, the control device comprising a configuration device determining the configuration data to configure the programmable function component of the preprocessing electronics of the structure-borne sound sensor unit; and a data output sending the configuration data to the structure-borne sound sensor unit, so that the structure-borne sound sensor unit functions as required for a desired application selected from the various sensor applications without design changes.

8. A control device as defined in claim 7, further comprising a signal input for receiving sensor signals, an evaluation device for evaluating the received sensor signals, and a signal output for sending out a control and/or information signal depending on the evaluated sensor signals.

9. A control device as defined in claim 7, wherein the control device is configured to control several such structure-bore sound sensor units.

10. A sensor system, comprising a structure-borne sound sensor unit for an agricultural machine and having modifiable sensing characteristics for various sensor applications, including a signal convertor which converts a mechanical sensor signal into an electrical sensor signal, and preprocessing electronics which are connected with said signal convertor and receive the electrical sensor signal, said preprocessing electronics including a programmable function component, said preprocessing electronics also including a data input for receiving configuration data; and a programming interface for configuring said function component of said preprocessing electronics based on the configuration data received to modify the sensing characteristics;

a control device comprising a configuration device for determining the configuration data to configure the programmable function component of the preprocessing electronics of the structure-borne sound sensor unit; and a data output for sending the configuration data to the structure-borne sound sensor unit, so that the structure-borne sound sensor unit functions as required for a desired application selected from the various sensor applications without design changes.

11. A sensor system as defined in claim 10, wherein said control device and/or said preprocessing electronics of said structure-borne sound sensor unit include a memory device in which a number of configuration data records for configuring the function component of said preprocessing electronics are stored.

12. A sensor system as defined in claim 11, wherein said configuration data records are assigned to various sensor applications of said structure-borne sound sensor unit.

13. A sensor system as defined in claim 10, wherein several said structure-borne sound sensor units are connected to said control device.

14. A sensor system as defined in claim 1, wherein said structure-borne sound sensor unit is configured for an agricultural machine.

15. A method for controlling a structure-borne sensor unit for an agricultural machine and having modifiable sensing characteristics for various sensor applications, comprising the steps of converting a mechanical sensor signal into an electrical sensor signal by a signal convertor for receiving the electrical sensor signal;

connecting preprocessing electronics with the signal convertor;

preprocessing a sensor signal that is received by the signal convertor in the processing electronics and transmitting to a control device where it is evaluated; and modifying a sensing characteristic of the structure-borne sound sensor unit using a software control for various sensor applications, so that the structure-borne sound sensor unit functions as required for a desired application selected from the various sensor applications without design changes.

16. A method as defined in claim 15; and further comprising using for the various sensor applications a sensor selected from the group consisting of a grain loss sensor, a vibration sensor for monitoring bearing plate between components that are movable relative to each other, a vibration sensor for monitoring a distance between the components that are movable relative to each other, and unbalanced sensor, and a falling object detector.

17. A method as defined in claim 15, wherein said modifying includes modifying the sensing characteristic with regard of a parameter selected from the group consisting of a signal frequency, a characteristic frequency curve, a signal amplitude, and a combination thereof.

18. A method as defined in claim 15, further comprising for changing the sensing characteristic, configuring an element selected from the group consisting of a digital filter, an amplifier device, an integrating device of the prepass electronics and a combination thereof.

19. A structure-borne sound sensor unit as defined in claim 1, wherein the preprocessing electronic is configured so that the programming interface configures said function component of said preprocessing electronic based on the configuration data received to modify its sensing characteristics so that the structure-borne sound sensor unit functions as required for desired application without design changes from the various sensor applications selected from the group consisting of as a grain loss sensor to measure grain losses, a vibration sensor for monitoring bearing plate and/or a distance between components that are movable relative to each other, as an unbalance sensor for monitoring a concentric running of a feed cylinder and to detect damage at an early stage, and as a foreign object detector for detecting foreign objects that are embedded in a crop material.

20. A structure-borne sound sensor unit as defined in claim 1, wherein said preprocessing electronics include said data input receiving the configuration data as specific configuration data selected from the group consisting of different configuration data.

21. A structure-borne sound sensor unit as defined in claim 7, wherein said preprocessing electronics include said data input receiving the configuration data as specific configuration data selected from a plurality of different configuration data.

22. A sensor system as defined in claim 10, wherein said preprocessing electronics include said data input receiving specific configuration data from different configuration data.

23. A method for controlling a structure-borne sensor unit as defined in claim 15, wherein said preprocessing includes configuring a function component of the preprocessing electronics based on the received configuration data as specified configuration data selected from a plurality of different configuration data.

* * * * *